United States Patent
Chandrasekharan et al.

(10) Patent No.: US 6,797,238 B2
(45) Date of Patent: Sep. 28, 2004

(54) APPARATUS AND PROCESS FOR VAPORIZING A HEAVY HYDROCARBON FEEDSTOCK WITH STEAM

(75) Inventors: Krishnamoorthy Chandrasekharan, The Hague (NL); Antonius Gijsbertus Johannes Kloth, Amsterdam (NL); Jeroen Van Westrenen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 574 days.

(21) Appl. No.: 09/850,943

(22) Filed: May 8, 2001

(65) Prior Publication Data

US 2002/0028977 A1 Mar. 7, 2002

(30) Foreign Application Priority Data

May 25, 2000 (EP) .............................................. 00201870

(51) Int. Cl.[7] ................................................ B01J 10/00
(52) U.S. Cl. ....................................... 422/129; 422/240
(58) Field of Search ................................ 422/129, 240, 422/236

(56) References Cited

U.S. PATENT DOCUMENTS

| | | | |
|---|---|---|---|
| 3,018,309 A | 1/1962 | Krejci | 260/679 |
| 3,959,401 A | 5/1976 | Albright et al. | 260/683 R |
| 3,985,820 A | 10/1976 | Albright et al. | 260/683 R |
| 4,498,629 A | 2/1985 | Grondman | 239/434.5 |
| 5,449,498 A * | 9/1995 | Cetinkaya | 422/144 |

FOREIGN PATENT DOCUMENTS

EP 0095197 4/1983

* cited by examiner

*Primary Examiner*—M. Alexandra Elve

(57) ABSTRACT

Apparatus for the vaporization of a heavy hydrocarbon feedstock with steam includes a frusto-conically-shaped element which is capable of inducing a gentle swirl pattern to a liquid-containing stream, which device is connected to the feed inlet pipe of the mixing nozzle. This swirl-inducing device effects a 90° bending of the flow direction of the hydrocarbon feedstock while simultaneously effecting a swirl pattern of the liquid part thereof, thereby forcing the liquid against the wall of the feed inlet pipe extending downwardly to the mixing nozzle with such velocity component perpendicular to the tube's longitudinal axis that an annular flow pattern is re-established.

10 Claims, 1 Drawing Sheet

APPARATUS AND PROCESS FOR VAPORIZING A HEAVY HYDROCARBON FEEDSTOCK WITH STEAM

The present invention relates to an apparatus and a process for vaporizing a heavy hydrocarbon feedstock with steam.

A well-known process for upgrading hydrocarbon feedstock to obtain valuable gaseous (mainly olefins) and liquid products therefrom is the so-called thermal cracking process. To reduce the hydrocarbon partial pressure during the cracking phase, the hydrocarbon feedstock is normally diluted with superheated steam in order to promote the vaporization of the hydrocarbon feedstock, prior to introducing the vaporized hydrocarbon feedstock into the cracking section of a furnace (the radiant section). Such a process is also called steam-cracking. In processing heavy hydrocarbon feedstocks, e.g. materials with a boiling range above 230° C., the vaporization of the liquid material is normally carried out in a plurality of stages. The hydrocarbon feedstock is first preheated, whereafter the still liquid feedstock is admixed with superheated steam to form a two-phase gas/liquid mixture and to simultaneously heat the liquid. The mixture of steam and liquid thus formed is further externally heated by exhaust from the radiant section to partially vaporize the liquid, whereafter the remaining liquid is fully vaporized by introducing a further amount of superheated steam into the flow of steam and partially vaporized liquid. This further amount of steam is, for example, added to the hydrocarbon feedstock by means of a nozzle wherein steam is introduced as an annulus around a core of the hydrocarbon feedstock. It is important that the feed to the radiant section of a cracking furnace—where the actual cracking reaction takes place—is fully vaporized, as the presence of liquid droplets may cause serious coke formation and fouling in the coils of the remaining high temperature part of the convection bank as well as in the radiant coils.

In the known mixing nozzles coke may be formed in the flowline, especially at the location where steam is introduced for the final vaporization step. This may eventually result in a diminished passage for liquid and steam in the mixing nozzle, resulting in an increase of the pressure drop over the mixing nozzle. This problem was also addressed in EP-A-95197 and a possible explanation for the coke formation was given therein. The solution to this problem as disclosed in EP-A-95197 involved a specific apparatus comprising a first (inner) tubular element and a second (outer) tubular element surrounding the first tubular element to form an annular space, wherein a first inlet means is provided for introducing a heavy hydrocarbon feedstock into the inner tubular element and a second inlet means is provided for introducing superheated steam into the annular space. The inner tubular element and the outer tubular element are each provided with an open end for the supply of the superheated steam as an annulus around a core of the heavy hydrocarbon feedstock, the open ends terminating in openings arranged in a plane, substantially perpendicular to the longitudinal axes. The apparatus also includes a frusto-conically-shaped element at one end connected to the open end of the second tubular element, provided with a longitudinal axis substantially coinciding with the longitudinal axes of the tubular elements and diverging in a direction away from the outer tubular element. The arrangement of a slightly diverging frusto-conically-shaped element behind the location where the superheated steam meets the heavy hydrocarbon feedstock prevents the contact of liquid droplets with the wall of the element thereby avoiding the risk of coke formation in the apparatus.

SUMMARY OF THE INVENTION

The present invention provides an improvement to the mixing nozzle disclosed in EP-A-95197, which improvement is particularly useful for large scale mixing nozzles as will be explained in more detail hereinafter.

After the first introduction of superheated steam, whereby a mixture of steam and liquid feedstock is formed, it is preferred that an annular flow regime is developed in the pipe to the mixing nozzle to fully wet its inner surface and consequently maximize the heat convection efficiency. The annular flow regime should have developed when the feedstock enters the mixing nozzle. The core of the annular flow is formed by vapor containing a mixture of hydrocarbons and steam. The annular flow of feedstock enters the mixing nozzle disclosed in EP-A-95197 in the inner tubular element thereof. In this mixing nozzle a second amount of superheated steam is added to the annular ring surrounding said inner tubular element. The large velocity difference between the steam in this annular ring-shaped confined space between inner and outer tube on the one hand and the liquid annular flow in the inner tube on the other hand creates shear forces and severe hydrocarbon flashing at the point where both flows meet to produce the fine droplet distribution required for mass and heat transfer. The fine droplet distribution will then ensure effective vaporization. The arrangement of a slightly diverging frusto-conically-shaped element behind the location where the superheated steam meets the liquid heavy hydrocarbon feedstock prevents the contact of liquid droplets with the wall of this element thereby avoiding the risk of coke formation in the mixing nozzle itself. Thus, it is important that the steam/liquid mixture entering the mixing nozzle's inner pipe has an annular flow pattern.

In practice, the mixing nozzle is often physically arranged vertically, adjacent to the convection section and on top of the roof of the radiant section. To accommodate such configuration in a space economic way, the pipe extending from the outlet of the convection section—normally arranged at the bottom part thereof—should, after a first short horizontal part, go up substantially vertically and should then be bent 180 degrees to go down vertically so that it can enter the vertically arranged mixing nozzle at the top. Typically the pipe extending from the convection section will make three angles of about 90° to accommodate for such configuration. However, these angles could destroy the annular flow pattern and change it into a slug flow pattern, which is undesired from a heat convection and vaporization point of view. The straight length after the third 90° bend (as seen from the convection section) should suitably be at least 5 times the annular width (i.e. diameter) to re-establish the fully developed annular flow pattern before entering the nozzle, as otherwise the fine droplet distribution would be deteriorated, which would, in return, lead to malfunctioning of the nozzle. Normally the length/diameter (L/D) ratio will not exceed 30. Given the dimensions of the nozzle itself and the required L/D ratio of at least 5 for a straight pipe after the third 90° bend to ensure an annular flow pattern, scaling up of a furnace to ensure a greater throughput of feed would require a larger diameter straight pipe and hence a much greater length of the pipe after the third 90° bend. As a consequence, the length of the pipe extending vertically from the convection section after the first 90° bend should increase equally. This would be very uneconomical, because of the higher amount of materials needed to construct the straight pipes and the additional support for these pipes. Moreover, the entire construction would require expensive plotspace.

The improved apparatus of the present invention aims to provide a solution to these problems associated with scaling up furnaces, while still ensuring that the steam/liquid mixture entering the mixing nozzle's inner tube has an annular flow pattern.

This is effected by using a specific device capable of inducing a gentle swirl pattern to a liquid-containing stream, which device is connected to the feed inlet pipe of the mixing nozzle. This swirl-inducing device will effect bending of the flow direction of the hydrocarbon feedstock with 90° while simultaneously effecting a swirl pattern of the liquid part thereof, thereby forcing the liquid against the wall of the feed inlet pipe extending downwardly to the mixing nozzle with such velocity component perpendicular to the tube's longitudinal axis that an annular flow pattern is reestablished.

Accordingly, the present invention relates to an apparatus for the vaporization of a heavy hydrocarbon feedstock with steam, said apparatus comprising:

(a) a first tubular element which is open at both ends;

(b) a second tubular element which is open at one end and surrounds the first tubular element to form an annular space, said first and second tubular element having substantially coinciding longitudinal axes and having open ends at their downstream ends arranged in a plane perpendicular to said coinciding longitudinal axes;

(c) feed inlet means for introducing a heavy hydrocarbon feedstock into the first tubular element;

(d) steam inlet means for introducing superheated steam into the annular space; and (e) a frusto-conically-shaped element, which at one end is connected to the open end of the second tubular element and diverges in a direction away from the second tubular element and which has an axis which is substantially coinciding with the longitudinal axes of the tubular elements, wherein the feed inlet means are connected to a device capable of forcing a swirl pattern onto the liquid part of the heavy hydrocarbon feedstock when entering said device, thereby pressing said liquid part against the inner wall of the feed inlet means in such a way that an annular flow pattern is established inside the first tubular element.

The heavy hydrocarbon feedstock to be evaporated in the apparatus according to the present invention typically has an initial boiling point above 200° C., more in particular 230° C. or higher, while the final boiling point will not normally exceed 650° C., more particularly 600° C. Examples of suitable feedstocks are hydrotreated flashed distillates or hydrocracked flashed distillates.

As regards the mixing nozzle and its components, reference is made to EP-A-95197. In this patent specification the mixing nozzle is described in detail and its contents are incorporated by reference herein.

Accordingly, in a preferred embodiment both the first tubular element and the second tubular element of the apparatus of the present invention terminate in open ends arranged in a plane perpendicular to the longitudinal axis of the tubular elements. These open ends supply the superheated steam as a non-swirling annulus around a core of the hydrocarbon feed. The frusto-conically-shaped element should have an apex angle of, at most, 20° and preferably of at least 6° with the small end of said frusto-conically-shaped element being coupled to the open end of the second tubular element and the axis of said frusto-conical element being substantially coinciding with said first and second tubular elements. The large end of the frusto-conically-shaped element is suitably connected to one end of a third tubular element having a longitudinal axis substantially coinciding with the longitudinal axes of the first and the second tubular elements. The other end of the third tubular element is suitably connected to a frusto-conically-shaped connecting element converging in a direction away from the third tubular element. The apparatus also suitably has a plurality of inlets for introducing superheated steam into the annular space between the first and second tubular element, which inlets are substantially equally distributed over the circumference of the second tubular element. Preferably, a plurality of guide vanes is arranged in the annular space, downstream of the inlet(s) for the superheated steam, said guide vanes being substantially uniformly distributed over a cross section of the annular space.

The swirl-inducing device connected to the feed inlet of the mixing nozzle must be capable of forcing a swirl pattern onto the liquid part of the heavy hydrocarbon feedstock when entering this device, thereby pressing said liquid part against the inner wall of the feed inlet means in such a way that an annular flow pattern is established inside the first tubular element. Simultaneously, the swirl-inducing device also ensures that the flow direction of the hydrocarbon feed is bent towards the mixing nozzle. Often this will imply that the flow direction is altered with an angle of 60 to 100°, normally about 90°.

The feed inlet means of the mixing nozzle suitably comprise a straight chain pipe connected to one open end of the first tubular element and having a longitudinal axis which substantially coincides with the longitudinal axis of the first tubular element. The L/D ratio of this inlet means should be at least 5 and will not normally exceed 30.

In general, any device known in the art capable of forcing a swirl pattern onto the liquid part of the heavy hydrocarbon feedstock when entering this device in such a way that an annular flow pattern is established inside the first tubular element can be used. Such device could have any suitable shape and may or may not contain internals for inducing the appropriate swirl pattern to the incoming liquid part of the feed. A very suitable swirl-inducing device is a so-called tangential inlet device. Such tangential inlet device preferably comprises (i) a frusto-conically or frusto-hemisperically-shaped element diverging in a direction away from the feed inlet means of the mixing nozzle and (ii) means for introducing the gas/liquid mixture of heavy hydrocarbons and steam into said frusto-conically or frusto-hemisperically-shaped element tangentially to the inner wall thereof. Such means will typically comprise a pipe which is connected to the side wall of the frusto-conically or frusto-hemisperically-shaped element and coincides with a tangent of the cross-section of said frusto-conically or frusto-hemisperically-shaped element. The use of a frusto-conically-shaped element is preferred.

In a further preferred embodiment, the large end of the frusto-conically or frusto-hemisperically-shaped element of the tangential inlet device is connected to one end of a further (or: fourth) tubular element having a longitudinal axis substantially coinciding with the longitudinal axes of the first tubular element, the other end of the tubular element being closed. This further tubular element comprises an opening in its side wall through which a heavy hydrocarbon feedstock can be introduced tangentially to the inner wall of said side wall.

DESCRIPTION OF THE PREFERRED EMBODIMENTS

Figure 1:
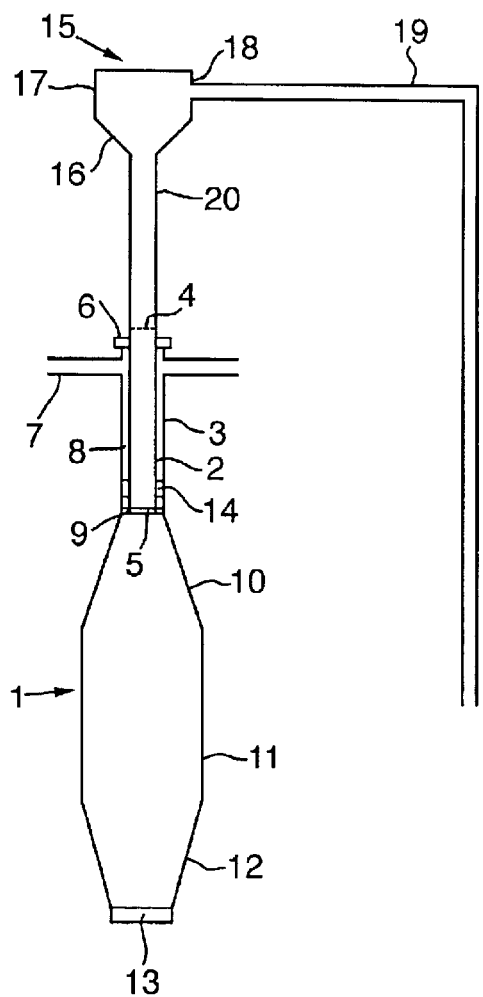
FIG. 1 shows a side view of the apparatus of the present invention.

FIG. 1 shows a side-view of a mixing nozzle 1 for supplying superheated steam to a partially vaporized heavy hydrocarbon feedstock for total vaporization thereof. The nozzle 1 comprises an inner, or first, tubular element 2 and an outer, or second, tubular element 3 having coinciding longitudinal axes. The inner tubular element 2 is open at one end to form an outlet 5 for the partially vaporized heavy hydrocarbon feedstock, while the inlet end 4 is connected with a straight feed inlet pipe 20 having the same diameter as the inner tubular element 2. The outer tubular element 3 being open at one end, is closed at the other end by means of a flange 6 welded to the inner tubular element 2. Inlet nozzles 7, being substantially equally distributed over the circumference of the outer tubular element 3, are provided for the supply of superheated steam into an annular space 8 between the inner tubular element 2 and the outer tubular element 3. In order to prevent the occurrence of swirls in the annular space 8, a plurality of guide vanes 14 are arranged and substantially uniformly distributed over the cross section of the annular space 8. The open end of the outer tubular element 3 and the outlet 5 of the inner tubular element 2 are arranged in a plane perpendicular to the coinciding longitudinal axes of the tubular elements 2 and 3 thereby forming an annular passage 9 for the discharge of superheated steam from the annular space 8. At its open end the outer tubular element 3 is connected to a frusto-conically-shaped element 10 provided with a longitudinal axis substantially coinciding with the longitudinal axes of the tubular elements. The frusto-conically-shaped element 10 diverges in a direction away from the outer tubular element 3. The frusto-conically-shaped element 10 has an apex angle of at most 20 degrees. The base of the frusto-conically-shaped element 10 is connected to a tubular element 11, which in return is connected to a second frusto-conically-shaped element 12, converging in a direction away from the tubular element 11. The frusto-conically-shaped element 12 is at its free end provided with a flange 13 for connecting the nozzle 1 to a feed line (not shown) of a thermal cracking unit.

The straight feed inlet pipe 20 is connected to the tangential inlet device 15 which consists of a frusto-conically-shaped element 16 diverging in a direction away from the inlet pipe 20 and a tubular element 17, which is closed at one end, connected thereto. The frusto-conically-shaped element 16 may have an apex angle of 10 to 150 degrees, the exact apex being determined by process parameters like velocity range of the incoming feed stream. It is within the normal skills of the skilled person to select the appropriate apex under the conditions applied.

The tubular element 17 has an opening 18 in its side wall, to which a feed inlet pipe 19 is connected in such a way as to introduce the partially vaporized hydrocarbon feed tangentially into said tubular element 17.

Figure 2:
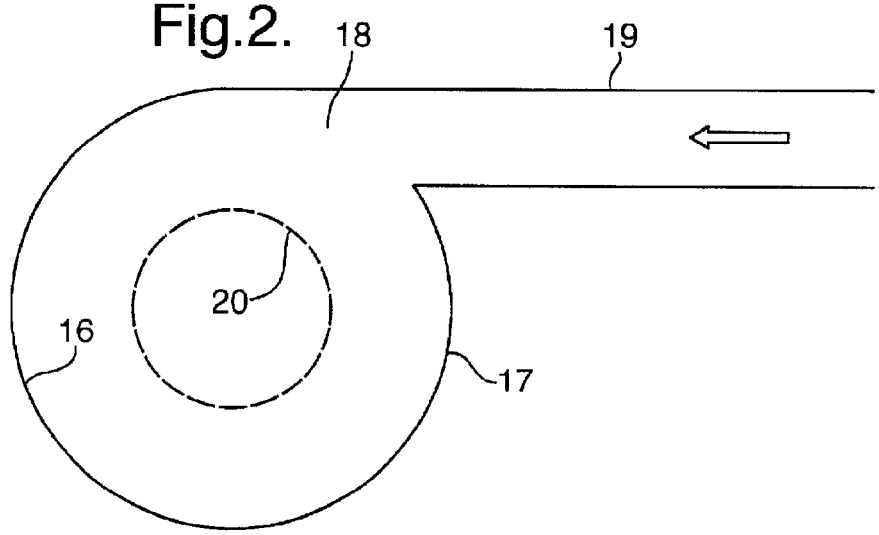
FIG. 2 is a top view of a suitable tangential inlet device.

In FIG. 2, showing a top-view of the tangential inlet device 15, the feed inlet pipe 19 is connected to the side wall of tubular element 17 at the opening 18 in the side wall thereof. Upon entering the tangential inlet device 15 in the direction of the arrow, a swirl is introduced in the partially vaporized hydrocarbon feed, and via the frusto-conically-shaped element 16 the swirling feed will enter the feed inlet pipe 20, thereby creating or re-establishing an annular flow pattern in this feed inlet pipe 20.

In a further aspect the present invention relates to a process for the vaporization of a heavy hydrocarbon feedstock with steam, wherein an apparatus as described hereinbefore is used.

The present invention also relates to a process for the preparation of lower olefins from a heavy hydrocarbon feedstock, which process comprises the steps of:

(a) preheating the hydrocarbon feedstock;

(b) mixing the still liquid feedstock with superheated steam to form a two-phase mixture of steam and liquid feedstock droplets;

(c) heating of this two-phase mixture to partially vaporize the liquid feedstock;

(d) fully vaporizing the remaining liquid feedstock by introducing a further amount of superheated steam using an apparatus as described hereinbefore;

(e) optionally superheating the vaporized hydrocarbon feed; and (f) subjecting the optionally superheated vaporized hydrocarbon feedstock to a cracking treatment.

The apparatus as described hereinbefore is arranged in a system for vaporization of heavy hydrocarbon feedstock prior to passing the feedstock to a cracking unit. A heavy hydrocarbon feedstock in liquid form is first passed through a preheater for heating the liquid, the heated liquid is subsequently mixed with superheated steam and passed through a furnace for partly vaporizing the liquid hydrocarbons to, for example, 70% percent vapor.

The partly vaporized liquid is subsequently mixed with a further quantity of superheated steam to evaporate the remaining liquid in the feedstock. The steam which is used in the last vaporization step should be superheated to such a temperature that the steam sensible heat is sufficient to vaporize the remaining liquid and give an extra margin of superheat to avoid the risk of condensation after mixing. Condensation of the steam should be avoided in view of the risk of erosion of the system.

At least the second mixing step could be carried out in an apparatus as described with reference to FIGS. 1 and 2. In the nozzle forming part of said apparatus the superheated steam is introduced into the annular space 8 via the steam inlet nozzles 7, whereas the partially vaporized liquid is introduced into the inner tubular element 2 via the inlet 4 thereof after the annular flow pattern of the partially vaporized hydrocarbon feed entering said inlet 4 has been ensured by means of the tangential inlet device 15 arranged upstream of said nozzle 1.

The steam leaving the annular space 8 via the annular outlet passage 9 forms an annulus around the core of hydrocarbon feedstock leaving the inner tubular element 2 via outlet 5.

The heat of the steam causes vaporization of the liquid remaining in the partially vaporized liquid leaving the inner tubular element 2. To prevent the passage of liquid droplets from the core of hydrocarbon feedstock to the wall of the nozzle with the aforementioned risk of coke formation, the annulus of steam and the core of hydrocarbon feedstock are passed through the frusto-conically-shaped element 10 located downstream of the outer tubular element 3.

The apex of the cone pertaining to the frusto-conically-shaped element 10 should be at most 20 degrees to prevent the occurrence of undesirable turbulence in the steam upon flowing into the frusto-conical element 10. Due to such a turbulence it is possible that still unvaporised liquid droplets may pass through the annulus of steam and adhere to the wall of the frusto-conically-shaped element, leading to coke formation. It has been found that an apex angle of about 6 degrees is sufficient to obtain the desired flow pattern in the frusto-conically-shaped element 10. A suitable apex angle is, for example, 16 degrees.

By the arrangement of the frusto-conically-shaped element 10, radial transport of the liquid droplets will not cause these droplets to reach the wall of the element 10.

The vaporization of liquid is completed in the tubular element 11 downstream of the frusto-conically-shaped element 10. The total length of the frusto-conically-shaped element 10 and the tubular element 11 should be so chosen that all liquid has been vaporized prior to leaving said tubular element. The mixture of steam and vapor is subsequently introduced into a cracking furnace via the frusto-conically-shaped connecting element 12, where the cracking treatment takes place. In the furnace the vapor is first superheated and, in an adjacent radiant section, finally heated at such a temperature that the hydrocarbon is cracked and converted into lighter fractions, which are recovered downstream the furnace via suitable compression and condensation steps.

It should be noted that the cross sectional area of the second tubular element is chosen such, that for a given amount of steam, required for a given amount of hydrocarbon feedstock, a high velocity of the steam in the annular space 8 is obtained, for example, about 75–80 m/s.

As regards process conditions, it is submitted that those conditions normally applied in this type of steam cracking processes are applicable. It will be appreciated by those skilled in the art that exact temperature and pressure conditions are determined by the nature of the feed.

What is claimed is:

1. Apparatus for the vaporization of a heavy hydrocarbon feedstock with steam, said apparatus comprising:
   (a) a first tubular element which is open at both ends;
   (b) a second tubular element which is open at one end and surrounds the first tubular element to form an annular space, said first and second tubular element having substantially coinciding longitudinal axes and having open ends at their downstream ends arranged in a plane perpendicular to said coinciding longitudinal axes;
   (c) feed inlet means for introducing a heavy hydrocarbon feedstock into the first tubular element;
   (d) steam inlet means for introducing superheated steam into the annular space; and
   (e) a frusto-conically-shaped element, which at one end is connected to the open end of the second tubular element and diverges in a direction away from the second tubular element and which has an axis which is substantially coinciding with the longitudinal axes of the tubular elements, wherein the feed inlet means are connected to a device capable of forcing a swirl pattern onto the liquid part of the heavy hydrocarbon feedstock when entering said device, thereby pressing said liquid part against the inner wall of the feed inlet means in such a way that an annular flow pattern is established inside the first tubular element.

2. Apparatus as claimed in claim 1, wherein the feed inlet means comprise a straight pipe connected to one open end of the first tubular element and having a longitudinal axis which substantially coincides with the longitudinal axis of the first tubular element.

3. Apparatus as claimed in claim 1 wherein the device for forcing a swirl pattern onto the liquid part of the heavy hydrocarbon feedstock is a tangential inlet device.

4. Apparatus as claimed in claim 2 wherein the device for forcing a swirl pattern onto the liquid part of the heavy hydrocarbon feedstock is a tangential inlet device.

5. Apparatus as claimed in claim 3, wherein the tangential inlet device comprises a frusto-conically or frusto-hemisperically-shaped element diverging in a direction away from said feed inlet means and means for introducing a heavy hydrocarbon feedstock into said frusto-conically or frusto-hemisperically-shaped element tangentially to the inner wall thereof.

6. Apparatus as claimed in claim 4, wherein the tangential inlet device comprises a frusto-conically or frusto-hemisperically-shaped element diverging in a direction away from said feed inlet means and means for introducing a heavy hydrocarbon feedstock into said frusto-conically or frusto-hemisperically-shaped element tangentially to the inner wall thereof.

7. Apparatus as claimed in claim 3, wherein the large end of the frusto-conically or frusto-hemisperically-shaped element of the tangential inlet device is connected to one end of a further tubular element having a longitudinal axis substantially coinciding with the longitudinal axes of the first tubular element, the other end of the tubular element being closed.

8. Apparatus as claimed in claim 4, wherein the large end of the frusto-conically or frusto-hemisperically-shaped element of the tangential inlet device is connected to one end of a further tubular element having a longitudinal axis substantially coinciding with the longitudinal axes of the first tubular element, the other end of the tubular element being closed.

9. Apparatus as claimed in claim 7, wherein the further tubular element comprises an opening in its side wall through which a heavy hydrocarbon feedstock can be introduced tangentially to the inner wall of said side wall.

10. Apparatus as claimed in claim 8, wherein the further tubular element comprises an opening in its side wall through which a heavy hydrocarbon feedstock can be introduced tangentially to the inner wall of said side wall.

* * * * *